US008656206B2

(12) United States Patent
Gasanov et al.

(10) Patent No.: US 8,656,206 B2
(45) Date of Patent: Feb. 18, 2014

(54) TIMER MANAGER ARCHITECTURE BASED ON BINARY HEAP

(75) Inventors: Elyar E. Gasanov, Moscow (RU); Ilya V. Neznanov, Moscow (RU); Yurii S. Shutkin, Moscow (RU); Andrey P. Sokolov, Moscow (RU); Pavel A. Panteleev, Moscow (RU)

(73) Assignee: LSI Corporation, San Jose, CA (US)

( * ) Notice: Subject to any disclaimer, the term of this patent is extended or adjusted under 35 U.S.C. 154(b) by 187 days.

(21) Appl. No.: 13/282,781

(22) Filed: Oct. 27, 2011

(65) Prior Publication Data
US 2012/0278648 A1 Nov. 1, 2012

(30) Foreign Application Priority Data

Apr. 26, 2011 (RU) .................................. 2011116257

(51) Int. Cl.
*G06F 1/00* (2006.01)
*G06F 1/14* (2006.01)
(52) U.S. Cl.
CPC ......................................... *G06F 1/14* (2013.01)
USPC .......................................... 713/502; 711/167
(58) Field of Classification Search
USPC ........... 713/500–503; 718/101–102; 709/230, 709/235; 711/167
See application file for complete search history.

(56) References Cited

U.S. PATENT DOCUMENTS

| 6,763,476 | B1 | 7/2004 | Dangi et al. | 713/502 |
| 6,823,467 | B1 | 11/2004 | Cantrill | 713/600 |
| 7,725,591 | B2 * | 5/2010 | Doering et al. | 709/230 |
| 7,793,299 | B2 | 9/2010 | Howland et al. | 718/108 |
| 8,239,871 | B2 * | 8/2012 | Ogasawara | 718/102 |
| 2006/0095444 | A1 | 5/2006 | Nadj et al. | 707/100 |
| 2010/0229181 | A1 * | 9/2010 | Ahuja et al. | 718/107 |

* cited by examiner

*Primary Examiner* — Raymond Phan
(74) *Attorney, Agent, or Firm* — Christopher P. Maiorana, PC

(57) ABSTRACT

An apparatus having a first memory and a circuit is disclosed. The first memory may be configured to store a plurality of timers. Each of the timers may have a respective value that indicates an expiration time. A first one of the timers nearest to expiring is generally stored at a first address of the first memory. The circuit may be configured to (i) assert a signal in response to the respective value of the first timer matching a counter of time, (ii) read a second of the timers and a third of the timers both from a second address of the first memory, (iii) sort the second timer and the third timer to determine which expires next and (iv) replace the first timer by writing one of the second timer or the third timer that expires next into the first memory at the first address.

22 Claims, 6 Drawing Sheets

TIMER MANAGER ARCHITECTURE BASED ON BINARY HEAP

This application claims the benefit of Russian Application No. 2011116257, filed Apr. 26, 2011 and is hereby incorporated by reference in its entirety.

FIELD OF THE INVENTION

The present invention relates to event timers generally and, more particularly, to a method and/or apparatus for implementing a timer manager architecture based on a binary heap.

BACKGROUND OF THE INVENTION

Some conventional timer managers implement a binary heap. Each element in the binary heap represents a single expiration time. The expiration times are presented as a one-dimensional linear array. The array stores the expiration times according to the following properties and equations:
    A root of the heap is located at array index 0, and
    A node at array index N:
        Has a "left child" at array index 2N+1;
        Has a "right child" at array index 2N+2; and
        Has a parent at array index floor((N−1)/2).

The timer manage commonly support large streams of request to create a new timer and delete an existing timer. Two sort procedures are used to implement the create requests and the delete requests. A bubble-up sort procedure is used when an element is added to the heap. The steps of the bubble-up procedure are as follows:
    Step 1. Add a new element to an empty heap location next to a current "tail of the heap". The tail of the heap is located at a bottom level of the heap in accordance with a shape property of the heap.
    Step 2. Compare the element being sorted with a parent of the element according to a comparison predicate. If the heap property criteria is satisfied, sorting is complete.
    Step 3. If not, swap the heap location of the element being sorted and the parent and continue with step 2.

A bubble-down sort procedure occurs as a side-effect of removing the element at the root of the heap. The steps of the bubble-down procedure are as follows:
    Step 1. Move the element currently located at the tail of the heap to the root of the heap.
    Step 2. Declare the root as an element being sorted.
    Step 3. Compare the two children of the element being sorted to each other according to the comparison predicate.
    Step 4. Compare the "winning child" from step 3 to the element being sorted according to the comparison predicate. If the heap property is satisfied, the sorting is complete.
    Step 5. If not, swap the heap location of the winning child with the element being sorted (the parent of the winning child) and continue with step 3.

The reading, comparing, swapping and writing of the elements to and from the array often takes considerable time until the sorting criteria is satisfied. Therefore, conventional time managers can take a long time to add elements to the heap and delete elements from the heap. Furthermore, the minimum period between successive expiration times is unacceptably long due to the bubble-down sort delays.

It would be desirable to implement a timer manager architecture based on a binary heap that supports a short minimum timer period and/or adds and deletes timers rapidly from the binary heap.

SUMMARY OF THE INVENTION

The present invention generally concerns an apparatus having a first memory and a circuit. The first memory may be configured to store a plurality of timers. Each of the timers may have a respective value that indicates an expiration time. A first one of the timers nearest to expiring is generally stored at a first address of the first memory. The circuit may be configured to (i) assert a signal in response to the respective value of the first timer matching a counter of time, (ii) read a second of the timers and a third of the timers both from a second address of the first memory, (iii) sort the second timer and the third timer to determine which expires next and (iv) replace the first timer by writing one of the second timer or the third timer that expires next into the first memory at the first address.

The objects, features and advantages of the present invention include providing a timer manager architecture based on binary heap that may (i) implement a short minimum timer period (e.g., 3 clock cycles), (ii) create new timers faster than the common techniques, (iii) delete existing timers faster than the common techniques, (iv) arrange the binary heap in a two-dimensional array, (v) occupy a low silicon area compared with common designs and/or (vi) utilizes multiple memories.

BRIEF DESCRIPTION OF THE DRAWINGS

These and other objects, features and advantages of the present invention will be apparent from the following detailed description and the appended claims and drawings in which.

DETAILED DESCRIPTION OF THE PREFERRED EMBODIMENTS

In some embodiments of the present invention, a timer manager may be used to maintain N general purpose timers (e.g., 2≤N≤1024) relative to a count value incremented by a clock signal. The timer manager generally supports at least two timer commands, a create command and a delete command.

When a new timer is created, timer configuration information may be stored by the timer manager in a memory circuit. The timer configuration information generally includes a start time parameter, a timer type parameter, a timer period parameter and event information. The start time parameter generally defines an initial expiration time for the timer. The timer type may be a parameter that indicates either a one-shot type of timer or a periodic type of timer. If the timer type is a one-shot timer, an event signal may be asserted and the one-shot timer may be deleted when or after the expiration time occurs. If the timer type is a periodic timer, the event signal may be asserted and a next timer expiration time is calculated for the timer when or after the periodic timer expiration time occurs. The next expiration timer is generally defined as a sum of the current expiration time and the timer period. If the next expiration time exceeds a maximum count value, the maximum count value may be subtracted from the next expiration time. The reduction of the next expiration time may be designed to match a roll over of the count value of the clock cycles.

A timer may enter an enqueue process from one of two possible events, a creation of a new timer (e.g., enqueue) or a requeue of an expired periodic timer. Each periodic timer may be requeued each time that the periodic timer expires. Therefore, the requeue process generally does not apply to one-shot timers. When a timer expires, the event information may be used to initialize an event described by the event information. When a timer delete request is received by the timer manager, the timer to be deleted may be marked by a "should be deleted" condition (or state). When a should-be-deleted timer expires, the associated event may not be initialized and the timer may be deleted.

Figure 1:
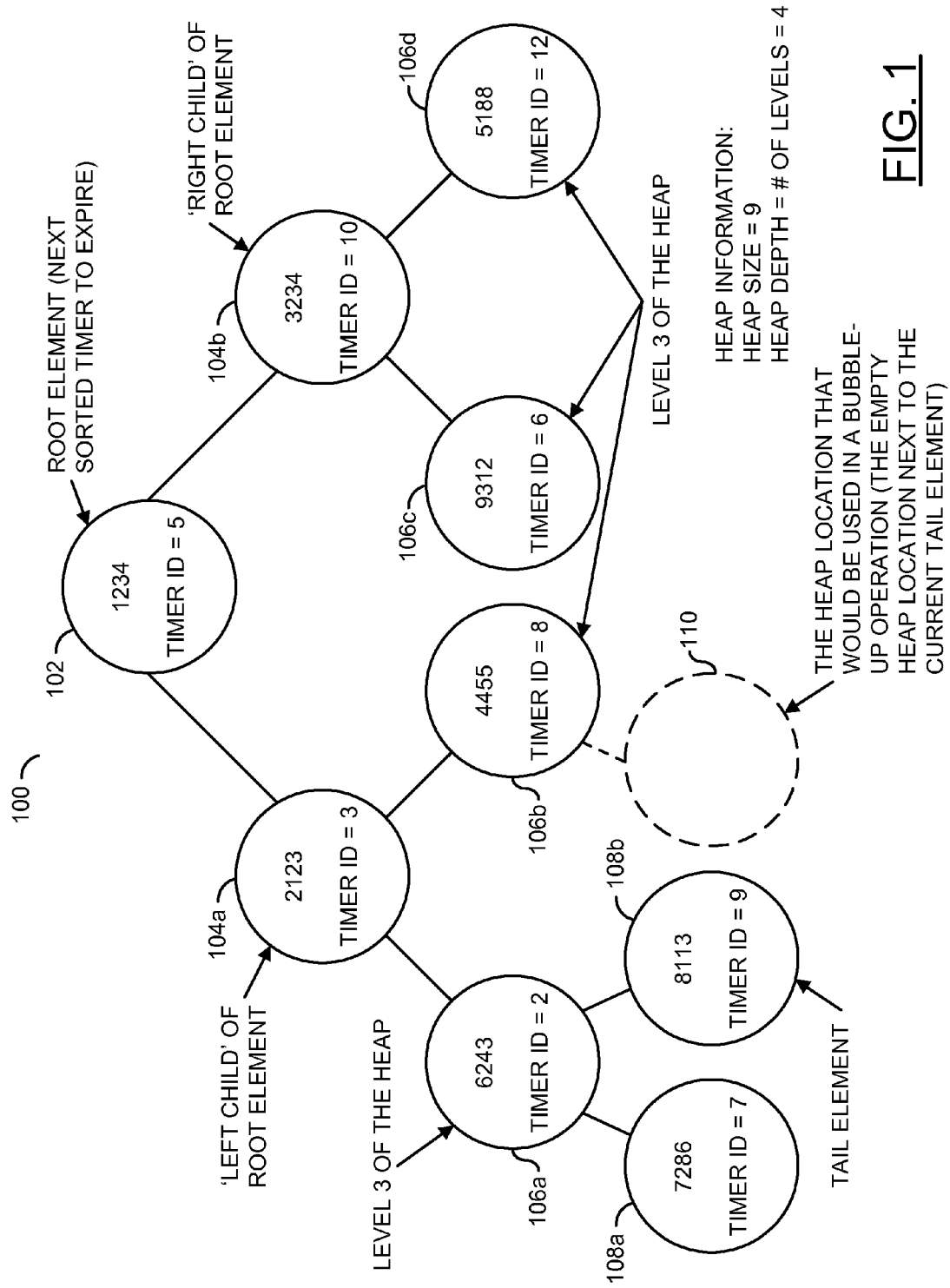
FIG. 1 is a diagram of an example binary minimum heap.

Referring to FIG. 1, a diagram of an example binary minimum heap 100 is shown. The heap 100 may be organized into multiple layers. A single element 102 generally resides at a top layer. Two elements 104a-104b may reside in a next layer below the top layer. The elements 104a-104b may be children of the parent element 102. Four elements 106a-106d may be located two layers below the top layer. The elements 106a-106b may be children of the parent element 104a. The elements 106c-106d may be children of the parent element 104b. In the example, two elements 108a-108b of eight possible elements may reside at a lowest level. The elements 108a-108b may be children of the parent element 106a. The element 108b may be a current tail element of the heap 100. A heap location 110 that may be used in an enqueue operation is generally an empty location next to the current tail element (e.g., 108b). The heap 100 generally illustrates a heap size of nine (e.g., nine of the heap locations may have the corresponding elements 102-108b) and a depth of four levels. Other size and depths of the heap 100 may be implemented to meet the criteria of a particular application.

Each element (or solid circle) shown generally represents a sorted timer. Numerical values illustrated in the top half of the timers 102-108b may be the respective expiration times. Timer identification values (e.g., timer_ID) shown in the lower half of the timers 102-108b may be an identification code used to link the timers 102-108b to the configuration information.

The heap 100 generally comprises a heap data structure created using a binary tree with two additional constraints. An additional constraint may be a shape property. The tree is generally a complete binary tree where all levels of the tree, except possibly the last level (e.g., deepest or lowest level) are fully filled. Furthermore, if the last level of the tree is not complete, the nodes of the last level may be filled from left to right. Another additional constraint may be a heap property. Each node may be greater than or match each corresponding child node according to a comparison predicate, which is fixed for the entire data structure.

For the timer manager, the comparison predicate may be based on the expiration times. Moreover, the comparison predicate may be a "less than or equal to" predicate (e.g., a minimum heap structure). Therefore, the timer corresponding to each node may always have an earlier or matching expiration time compared with each of the children of the respective node.

The following variables may be used to explain the operation of the timer manager. The variable N may be a maximum number of general purpose timers. The variable N is generally an integer power of 2, for example N=1024. A variable W may be a width (e.g., number of bits) of each timer_ID. The width may be calculated as $W=\log_2(N-1)$. For example, if N=1024, $W=\log_2(1023)=10$ bits. A variable T_W may be a width (e.g., number of bits) of the expiration times and the start times. Typical values of the variable T_W may be 32, 24 or 16 bits. A variable P_W may be a width (e.g., number of bits) of the timer period. Example values of the variable P_W may be 31, 30 or 29 bits. A variable E_W may be a width (e.g., number of bits) of the event information. Other widths may be implemented for the variables to meet the criteria of a particular application.

Figure 2:
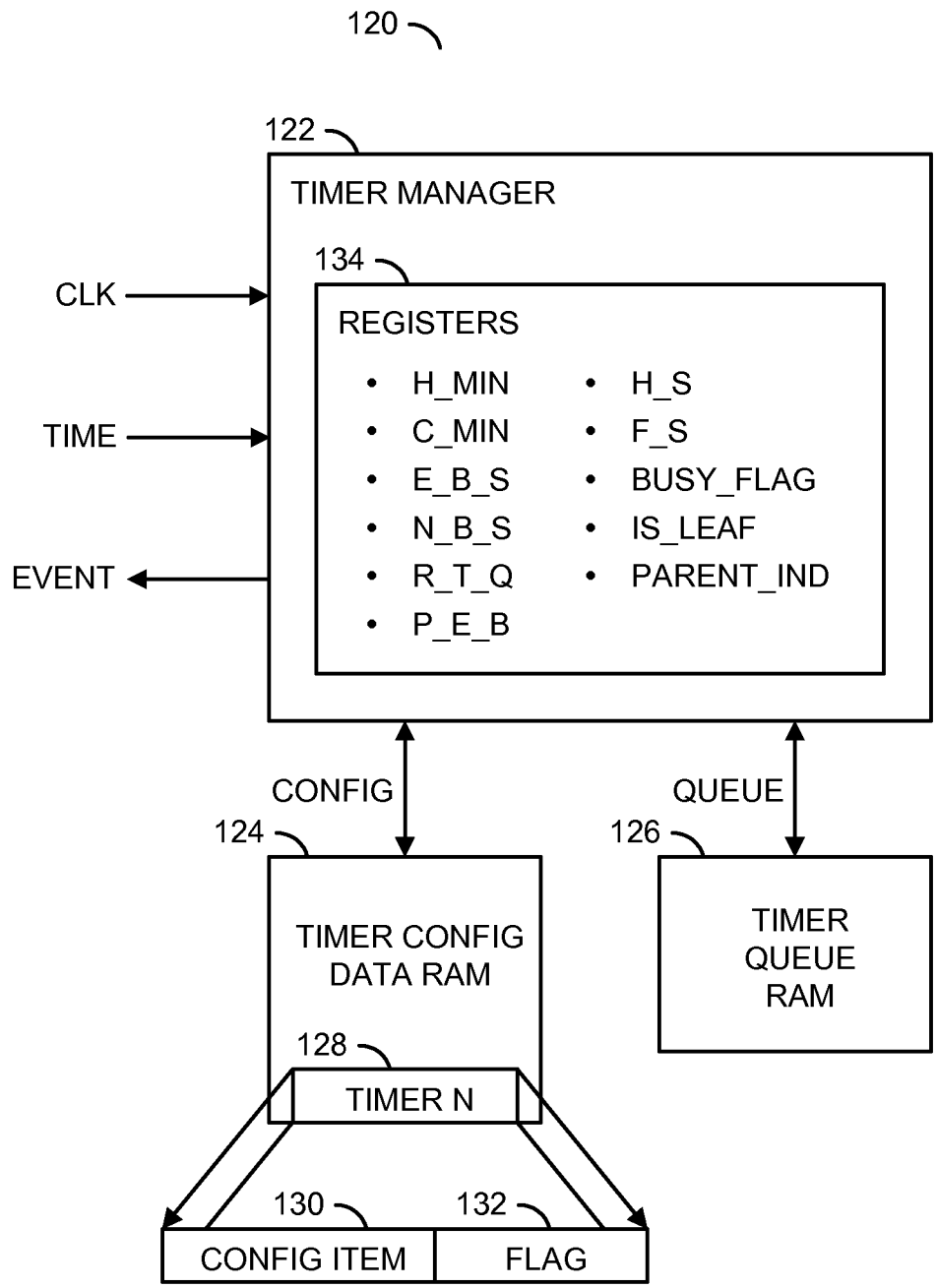
FIG. 2 is a block diagram of an apparatus in accordance with a preferred embodiment of the present invention.

Referring to FIG. 2, a block diagram of an apparatus 120 is shown in accordance with a preferred embodiment of the present invention. The apparatus (or device, circuit or integrated circuit) 120 generally implements a timer manager. The apparatus 120 may comprise a block (or circuit) 122, a block (or circuit) 124 and a block (or circuit) 126. The circuits 122-126 may represent modules and/or blocks that may be implemented as hardware, firmware, software, a combination of hardware, firmware and/or software, or other implementations.

A signal (e.g., CLK) may be received by the circuit 122. The signal CLK may convey a system clock to the circuitry within the circuit 120. A signal (e.g., TIME) may be received by the circuit 122. The signal TIME generally conveys the current count value of the number of clock cycles. In some embodiments, a counter of the clock cycles may be implemented within the circuit 122 and the signal TIME may be eliminated. A signal (e.g., EVENT) may be generated by the circuit 122. The signal EVENT may have an asserted state (or condition) when a timer has expired and a deasserted state (or condition) otherwise. In some embodiments, the asserted state may be indicated by the circuit 122 transmitting the event information of the just-expired timer in the signal EVENT. The circuit 122 may communicate bidirectionally with the circuit 124 via a signal (e.g., CONFIG). A signal (e.g., QUEUE) may provide bidirectional communications between the circuit 122 and the circuit 126.

The circuit 122 generally implements a timer manager circuit. The circuit 122 may be operational to compare a respective value of the next timer to expire with the time count value received in the signal TIME. When the respective value of the next timer to expire matches the time count value in the signal TIME, the circuit 122 may assert the signal EVENT. The circuit 122 may also read two additional timers both from a same address of the circuit 126. The two additional timers may be sorted to determine which timer expires next. Once the next timer to expire has been determined, the circuit 122 generally replaces the just-expired timer by writing the next-to-expire timer into the circuit 126 at the same address of the just-expired timer.

The circuit 122 may implement several processes (or methods) that add timers to the heap 100 and delete timers from the heap 100. Adding timers generally involves an enqueue (or create or bubble-up) process in which a new timer is added to an empty location (e.g., the location 110). The newly added timer may be compared with a parent timer in a parent location (e.g., the location 106b). If the newly added timer expires before the parent timer, the two timers are swapped in the heap 100. If the newly added timer expires at the same time or later than the parent timer, the enqueue process may be ended. The above comparison is generally repeated between a child timer and a parent timer (e.g., bubbles up the heap 100) until the child timer expires at the same time or after the parent time.

Deleting timers generally involves a requeue (or bubble-down) process in which the timer at the root location is to be removed from the heap 100. The timers that are the children (e.g., timers 104a-104b) of the timer to be removed (e.g., the timer 102) may be read from the circuit 126 to the circuit 122 and compared with each other. The child timer with the earlier expiration time (e.g., the winning child timer) is generally written into the root location of the heap 100. The children of the winning child timer may be subsequently read from the circuit 126 and compared. The new winning child generally takes the place of the original winning child in the heap 100. The comparison process may continue comparing lower pairs of children (e.g., bubbles down the heap 100) until all of the timers have been sorted.

The circuit 122 may contain multiple registers 134. When data is stored in a register 134, the data is generally available from the register 134 at a next clock cycle. If a name of a register is designated as one or more characters (e.g., R), the data stored in and presented by the register R may be denoted as data R. The registers 134 may include, but are not limited to, the following registers:

A register (e.g., H_MIN) may be used to store timer information (e.g., expiration time and timer_ID) for the timer with the minimal expiration time. A width of the register H_MIN is generally (T_W)+W bits. Other timer information may be stored in the circuit 126 as a binary heap tree. An expiration time field of the register H_MIN may be denoted as H_MIN.ET. A timer identification field of the register H_MIN may be demoted as H_MIN.ID.

A register (e.g., C_MIN) may be used to store timer configuration information for the timer where the timer_ID matches the timer field H_MIN.ID. The register C_MIN generally contains a copy of the contents stored at the address H_MIN.ID of the circuit 124. A width of the register C_MIN may be (P_W)+(E_W)+2 bits. A timer period field of the register C_MIN may be denoted as C_MIN.P. A timer type field of the register C_MIN may be denoted as C_MIN.T. An event information field of the register C_MIN may be denoted as C_MIN.E. A should-be-deleted field of the register C_MIN may be denoted as C_MIN.D.

A register (e.g., E_B_S) is generally used to store the timer being sorted. A width of the register E_B_S may be (T_W)+W bits. An expiration time field of the register E_B_S may be denoted as E_B_S.ET. A timer identification field of the register E_B_S may be denoted as E_B_S.ID.

A register (e.g., N_B_S) may be used to store the index of the timer being sorted. A width of the register N_B_S may be W bits.

A register (e.g., R_T_Q) is generally used to store read data from the circuit 126. A width of the register R_T_Q may be 2×((T_W)+W) bits. When a read command is sent to the circuit 126, the read data generally appears at the circuit 122 at a next clock cycle. In the circuit 122, the read data may be immediately stored in the registers 134. Thereafter, the read data may be available from the registers 134 two clock cycles after the read command is issued.

A register (e.g., P_E_B_S) may be used to store a timer forming a pair timers related to the timer being sorted. A width of the register P_E_B_S may be (T_W)+W bits. An expiration time field of the register P_E_B_S may be denoted as P_E_B_S.ET. A timer identification field of the register P_E_B_S may be denoted as P_E_B_S.ID.

A register (e.g., H_S) is generally used to store a current number of sorted, active timers. If H_S=1, the circuit 126 may be empty. If H_S>1, the number of sorted timers the circuit 126 may be (H_S)−1 timers. The value (H_S)−1 may be the index of the binary heap array suitable to locate a new timer. An initial value in the register H_S may be zero. A width of the register H_S may be W bits.

A register (e.g. F_S) may be used to store a current number of all timers, both active and suspended. A value (F_S)−(H_S) may be the number of suspended timers. The suspended timers may be located in the circuit 126 after the tail element of binary heap 100. An initial value stored in the register F_S may be zero. A width of the register F_S is generally W bits.

A register (e.g., BUSY_FLAG) generally indicates that some binary heap process is either in progress (e.g., a busy state or busy condition) or not in progress (e.g., an idle state or idle condition). A width of the register BUSY_FLAG may be 1 bit.

A register (e.g., IS_LEAF) is generally used to store whether the node is a leaf (e.g., a leaf state or leaf condition) or not a leaf (e.g., a non-leaf state or non-leaf condition). A width of the register IS_LEAF may be 1 bit.

A register (e.g., PARENT_ID) is generally used to store an index value of the node being sorted. A width of the register PARENT_ID is generally W bits.

The circuit 124 may implement a memory circuit. In some embodiments, the circuit 124 may be deigned as a single-port Random Access Memory (RAM) circuit. The circuit 124 is generally operational to store a configuration word 128 for each of the timers 102-108*b*. Each configuration word 128 may comprise a respective configuration data (or item) 130 and a respective flag 132. The circuit 124 may have N addresses. At each address, the circuit 124 may store the configuration word 128 of a respective one of N possible timers. Storage of the configurations word 128 generally parallels the timer identification numbers. For example, a timer with a timer identification of zero may be stored in the circuit 124 at the address zero. A timer with a timer identification of one may be stored in the circuit 124 at the address one. A timer with a timer identification of two may be stored in the circuit 124 at the address two, and so on. The configurations words 128 may be written to and read from the circuit 124 via the signal CONFIG. A width of the circuit 124 may be (P_W)+(E_W)+2 bits, where P_W is the width of the timer period and E_W is the width of the event information.

The configuration data 130 generally contains the timer period and the event information. The flags 132 generally contains either a should-be-deleted condition (or state or logical 0) or an active condition (or state or logical 1). Each flag 132 holding the should-be-deleted condition generally indicates that the associated timer should be deleted upon expiration. Each flag 132 holding the active condition generally indicates that the event information associate with the timer should be executed upon expiration. An initial value of each flag 132 may be zero (e.g., should-be-deleted condition).

The circuit 126 may implement another memory circuit. In some embodiments, the circuit 126 may be deigned as a single-port RAM circuit. The circuit 126 is generally operational to store the timers 102-108*b*. Each timer 102-108*b* generally has a respective value that indicates when the timers expire. Each timer 102-108*b* may also have the timer identification value. The timer closest to expiring (e.g., timer 102) may be stored in the circuit 126 at the base (or zero) address of the circuit 126.

The circuit 126 generally stores the timers 102-108*b* in a binary minimum heap structure. To improve sorting times, in particular the requeue process durations, the binary heap structure may be represented by a two-dimensional array. The array may be disposed in the circuit 126 such that both children of a node may be located at the same addressable entry (e.g., row) of the circuit 126. The upper-half of an addressable entry generally maintains "left child information", while the lower-half of the addressable entry maintains "right child information". Therefore, the apparatus 120 (the circuit 122) may determine the properties using the following properties and equations:

The root of the heap 100 may be located at array index 0=address 0 in the circuit 126 (e.g., right child);

The node at array index N=address (floor(N/2)+P), where P=1 if N is odd (e.g., a left-child), and P=0 if N is even (e.g., a right-child);

If the node is a left-child located in the upper-half of the entry at an address M of the circuit 126 (N is odd):
  The left-child node viewed as a parent may have a "left child" at array index 2N+1=address 2M (e.g., upper-half entry);
  The left-child node viewed as a parent may have a "right child" at array index 2N+2=address 2M (e.g., lower-half entry); and
  The left-child may have a parent at array index floor((N−1)/2)=address M/2. The parent may be a "left-child" (e.g., upper-half entry) of another node if mod (M/2)=0. The parent may be a "right-child" (e.g., lower-half entry) of another node if mod (M/2)=1;

If the node is a right-child located in the lower-half of the entry at the address M of the circuit 126 (N is even):
  The right-child node viewed as a parent may have a "left child" at array index 2N+1=address 2M+1 (e.g., upper-half entry);
  The right-child mode viewed as a parent may have a "right child" at array index 2N+2=address 2M+1 (e.g., lower-half entry); and
  The right-child may have a parent at array index floor ((N−1)/2)=address M/2. The parent may be a "left-child" (e.g., upper-half entry) of another node if mod (M/2)=0. The parent may be a "right-child" (lower-half entry) of another node if mod (M/2)=1.

Figure 3:
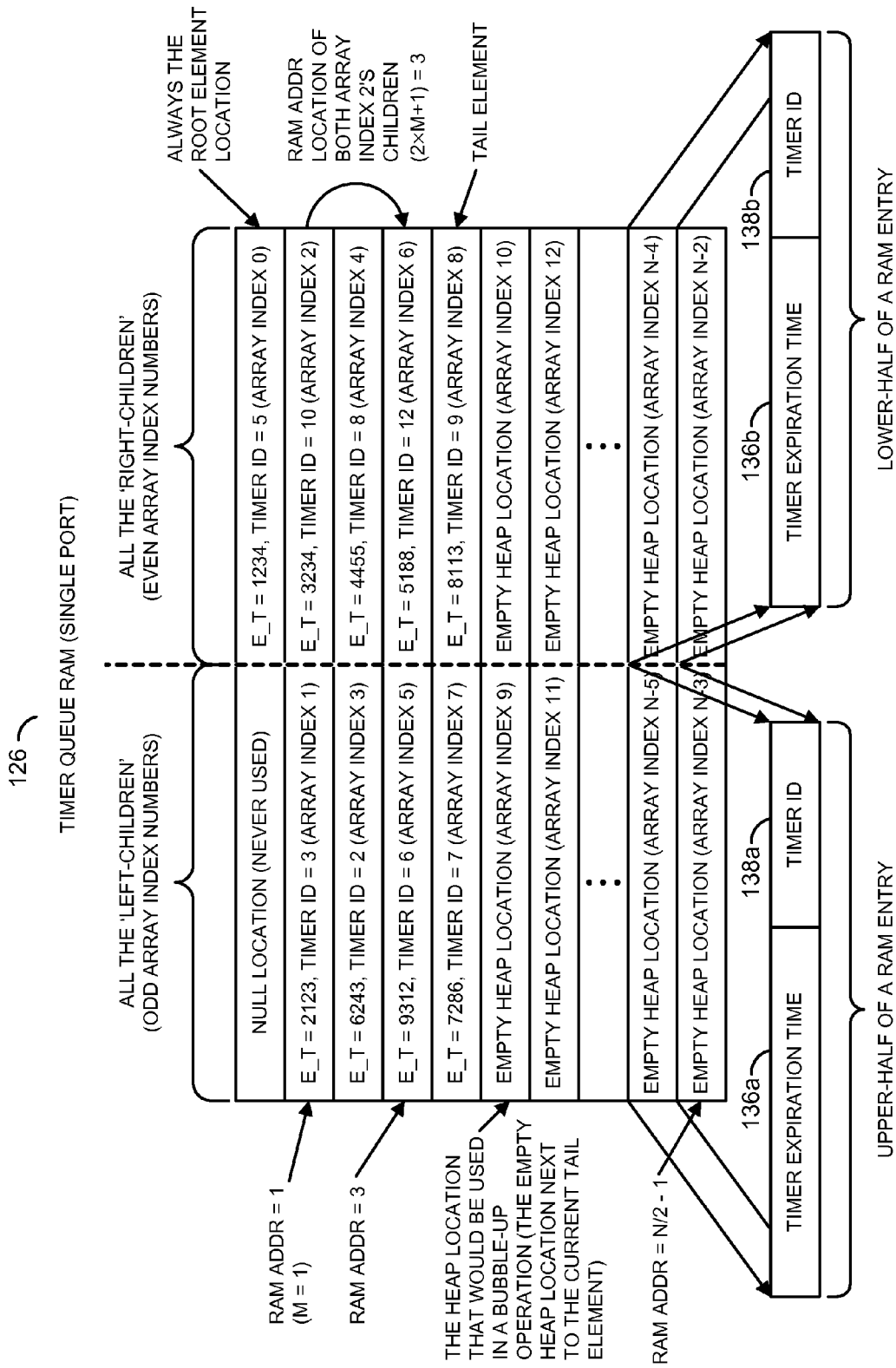
FIG. 3 is a diagram of an example distribution of the contents of a timer queue memory.

Referring to FIG. 3, a diagram of an example distribution of the contents of the circuit 126 is shown. The contents may illustrate the binary minimum-heap depicted in FIG. 1. Each address (row, entry or word) in the circuit 126 generally contains information for two timers 102-108*b* (e.g., the information corresponding to both children of a node). For each timer/child, the circuit 126 may maintain a timer expiration time parameter 136*a* (left child) or 136*b* (right child) and a timer identification parameter 138*a* (left child) or 138*b* (right child). A width of the circuit 126 may be 2×((T_W)+W) bits, where T_W may be the width of the expiration timer and start time. A size (or depth) of the circuit 126 may be N/2 addressable lines (rows or words), where N is the maximum number of timers supported.

Returning to FIG. 2, the circuit 122 may include several built-in functions. The functions may include, but are not limited to, the following functions (or operations):

Loc(N)=(N+1)/2. If N is a number of the binary heap array index, the function Loc(N) may be the address in the circuit 126 where the node with index N is located.

Mod(N)=mod(N). If N is odd, mod(N)=1. The odd N generally means that binary heap node with the index N is a "left-child" (upper-half entry in the circuit 126). If N is even, mod(N)=0. The even N generally means that the binary heap node with index N is a "right-child" (lower-half entry in the circuit 126).

Val(N) may be the contents of the lower-half entry of the circuit 126 at the address Loc(N) if mod(N)=0. Val (N) may be the contents of the upper-half entry in the circuit 126 at the address Loc(N) if mod(N)=1.

TwinVal (N) may be the contents of the upper-half entry of the circuit 126 at the address Loc(NY if mod(N)=0. TwinVal (N) may be the contents of the lower-half entry of the circuit 126 at the address Loc(N) if mod(N)=1.

Father(N)=(N−1)/2 is generally the index of the parent of the node with the index N.

FatherLoc(N)=Loc(Father(N))=Loc(N)/2. If N is a number of the binary heap array index, the function FatherLoc(N) may return the address of the circuit 126 where the parent of the node with the index N is located.

FatherVal(N)=Val((N−1)/2) may return the contents of the parent of the node with the index N.

ChildrenLoc(N)=2×Loc(N)+1-mod(N) may return the location address of the children of the node with the index N.

LeftChild(N)=2N+1 may be the index of the left child of the node with the index N.

RightChild(N)=2N+2 may be the index of the right child of the node with the index N.

LeftChildVal(N)=Val(2N+1) may be the contents of the left child of the node with the index N.

RightChildVal(N)=Val(2N+2) may be the contents of the right child of the node with the index N.

Figure 4:
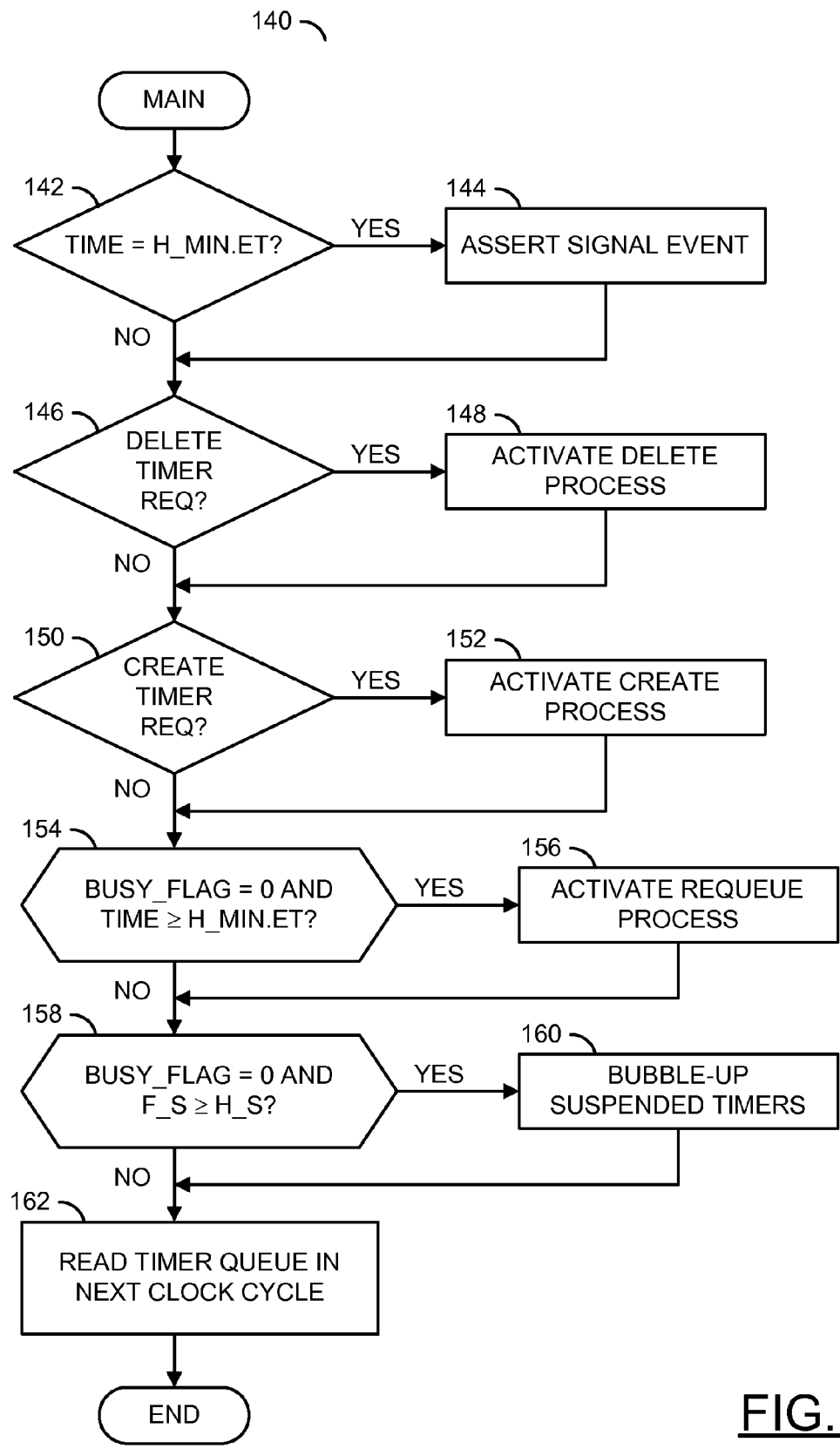
FIG. 4 is a flow diagram of an example implementation of a main process.

Referring to FIG. 4, a flow diagram of an example implementation of a main process 140 is shown. The process (or method) 140 may be executed by the circuit 122. The process 140 generally comprises a step (or state) 142, a step (or state) 144, a step (or state) 146, a step (or state) 148, a step (or state) 150, a step (or state) 152, a step (or state) 154, a step (or state) 156, a step (or state) 158, a step (or state) 160 and a step (or state) 162. The steps 142-162 may represent modules and/or blocks that may be implemented as hardware, firmware, software, a combination of hardware, firmware and/or software, or other implementations.

In the step 142, the circuit 122 may determine if a value of a system timer (e.g., the signal TIME) matches H_MIN.ET (e.g., the expiration time of the next timer to expire). If the time and H_MIN.ET match (e.g., the YES branch of step 142), the circuit 122 may assert the signal EVENT in the step 144. The assertion of the signal EVENT generally conveys the event information from the register C_MIN. If the time and H_MIN.ET are different (e.g., the NO branch of the step 142), the process 140 may continue with the step 146.

In the step 146, the circuit 122 may determine if a delete timer request has occurred. If at least one delete request has occurred (e.g., the YES branch of step 146), the circuit 122 may activate a delete process in the step 148. If no delete timer request has occurred (e.g., the NO branch of step 146), the process 140 may continue with the step 150.

The step 150 generally checks for the occurrence of a create timer request. If at least one create request occurs (e.g., the YES branch of step 150), the circuit 122 may activate a create (enqueue) process in the step 152. In no create requests have been received (e.g., the NO branch of step 150), the process 140 may continue with the step 154.

In the step 154, the circuit 122 may check the register BUSY_FLAG and the signal TIME. If the value BUSY_FLAG=0 and the value of system timer is not less than H_MIN. ET (e.g., the YES branch of step 154), the circuit 122 may activate a requeue process in the step 156. If the value BUSY_FLAG=1 or the value of the system timer is less than the value H_MIN.ET (e.g., the NO branch of step 154), the process 140 may continue with the step 158.

The circuit 122 may check the registers BUSY_FLAG, F_S and H_S in the step 158. If the value BUSY_FLAG=0 and F_S>H_S (e.g., the YES branch of step 158), the circuit 122 may start the enqueue process for the suspended timers in the step 160. The circuit 122 may also set the value BUSY_FLAG=1 and set the value N_B_S=H_S in the step 160. A read command may be sent to the circuit 126 to read the contents from the address Loc(H_S) in the step 160. The circuit 122 may also set the value H_S=H_S+1. If the value BUSY_FLAG=1 or F_S<H_S (e.g., the NO branch of step 158), the process 140 may continue with the step 162.

The step 162 may be executed in a next clock cycle of the circuit 122. The contents of the circuit 126 read from the address Loc (N_B_S) may be received by the circuit 122. The circuit 122 may store the value Val(N_B_S) to the register E_B_S. The circuit 122 may store the value TwinVal(N_B_S) to the register P_E_B_S. The function FatherLoc( ) may calculate FatherLoc(N_B_S). The circuit 122 may send a read command to the circuit 126 for the contents at the address FatherLoc(N_B_S). The step 162 may end with a jump to a step 3 of the enqueue process.

Delete Process: The delete process may include the following steps:

Step 1. A "Delete" command received by the circuit 122 from external circuitry (e.g., a processor or CPU) may initiate the delete process. Let a value (e.g., ID) be the value of the timer_ID being deleted.

Step 2. If H_MIN.ID=ID, set C_MIN.D=1 and activate the requeue process. If H_MIN.ID≠ID, set in the circuit 124 at the address ID the FLAG=1 (e.g., the should-be-deleted condition).

Step 3. End the delete process.

Enqueue Process: The enqueue (create or bubble-up) process may include the following steps:

Step 1. A "Create" command received by the circuit 122 generally initiates the bubble up process, Let a value C be a timer configuration. A value C.ID may be the timer_ID. A value C.S may be the start time. A value C.T may be the timer type (e.g., one-shot or periodic). A value C.P may be the timer period. A value C.E maybe the event information.

Step 1a. The circuit 122 may aggregate information to write in circuit 124 in the following arrangement (C.P, C.T, C.E, 0). The aggregate (C.P, C.T, C.E, 0) may be written in the circuit 124 at the address C.ID.

Step 1b. Calculate the expiration time of a new timer E_T=T+(C.S), where T may be a current system time. The value ID of the new timer_ID may be set to C.ID.

Step 1c. An information value pair (E_T, ID) for the binary heap 100 may be stored to the register E_B_S.

Step 1d. If the value H_S=0, the timer may be an initial timer in the heap 100. The value pair (E_T, ID) is generally stored in the register H_MIN. The aggregated values (C.P, C.T, C.E, 0) may be stored in the register C_MIN. The storing may stop if complete, else the sorting may continue to step 1e.

Step 1e. Compare the value E_T with the value H_MIN.ET. If the value E_T<H_MIN.ET, the value pair (E_T, ID) may be stored in the register H_MIN and the values(C.P, C.T, C.E, 0) may be stored in the register C_MIN. The value E_T may be set to H_MIN.ET and the value ID may be set to H_MIN.ID (e.g, the values H_MIN and (E_T, ID) may be swapped.)

Step 1f. If the value H_S>1 and the value BUSY_FLAG=1, the previous binary heap process is generally paused and the value pair (E_T, ID) may be written in the circuit 126 at the address (F_S)+1. The value F_S may be set to (F_S)+1. The process may continue at the step 2a.

Step 1g. If the value H_S>1 and the value BUSY_FLAG=0 and the value F_S>H_S, the value pair (E_T, ID) may be written in the circuit 126 at the address (F_S)−1. The value F_S may be set to (F_S)+1. The enqueue process may be stopped, otherwise continue with step 1h.

Step 1h. If the value H_S=1, the value pair (E_T, ID) may be written in the circuit 126 at the address 0 and the process stopped, else continue with step 1i.

Step 1i. A case generally remains where the value H_S>1 and the value BUSY_FLAG=0 and the value F_S=H_S. Occurrence of the case generally means that the enqueue process should be started. In the step 1i, the value BUSY_FLAG may be set to 1. The value N_B_S may be set to (H_S)−1.

Step 1j. If the value (H_S)−1 is even, the circuit 122 may read the twin child timers (elements) for the timer being sorted. Therefore, a read command may be sent to the circuit 126 for the contents at the address Loc((H_S)−1). The value H_S may be set to (H_S)+1. If the value (H_S)−1 is even, the process may continue at the step 2b, else the process may continue with step 1k.

Step 1k. If the value (H_S)−1 is odd, the circuit 122 may calculate FatherLoc ((H_S)−1) and send a read command to the circuit 126 for the contents at the address FatherLoc ((H_S)−1). The value H_S may be set to (H_S)+1. If the value (H_S)−1 is odd, the process may continue with the step 3, else the process may continue with step 2.

Step 2. During a next clock cycle:

Step 2a. The circuit 122 may continue the previous binary heap process and stop the enqueue process.

Step 2b. The circuit 126 may present the contents from the address Loc(N_B_S). The value TwinVal (N_B_S) may be stored to the register P_E_B_S. The circuit 122 may calculate FatherLoc(N_B_S) and send a read command to the circuit 126 to read the contents from the address FatherLoc(N_B_S). The process may continue with step 3.

Step 3. During a next clock cycle: The circuit 126 generally presents the requested content from the address FatherLoc (N_B_S) to the circuit 122. The circuit 122 may store the contents received from the circuit 126 to the register R_T_Q. The process may continue with step 4.

Step 4. During a next clock cycle: The register R_T_Q may contain and present the contents copied from the circuit 126 at the address FatherLoc(N_B_S). The circuit 122 may compare the values E_B_S.ET and FatherVal(N_B_S).ET (e.g, FatherVal(N_B_S) may be either the left part or the right part of the register RT_Q as appropriate). The value FatherVal(N_B_S).ET≤E_B_S.ET generally means that the heap property criteria is satisfied. Therefore, the values E_B_S and P_E_B_S may be written in correct order into the circuit 126 to the address Loc(N_B_S). The value BUSY_FLAG may be set to zero and the process may stop. The value FatherVal(N_B_S).ET>E_B_S.ET generally means that the timer being sorted and a parent timer should be swapped. If the value Father (N_B_S)=0 (parent of root), a set of value ((0,0), E_B_S) may be written in the circuit 126 to the address 0. The process may continue to step 5a. The values (0,0) may mean that upper-half entry of the circuit 126 at the address 0 is not used and so may be set any value (e.g., the values (0,0)). If the value Father(N_B_S)>0, the value FatherLoc(Father(N_B_S)) may be calculated by the circuit 122 and a read command may be sent to the circuit 126 for the contents from the address FatherLoc(Father(N_B_S)). The process may continue at step 5b.

Step 5. During a next clock cycle:

Step 5a. Write the values P_E_B_S and FatherVal(N_B_S) (in correct order) in the circuit 126 to the address Loc (N_B_S). The circuit 122 may set the value BUSY_FLAG to zero and stop.

Step 5b. Write the values P_E_B_S and FatherVal(N_B_S) (in correct order) in the circuit 126 to the address Loc (N_B_S). The circuit 122 may store the value TwinVal(Father (N_B_S)) in the register P_E_B_S. The circuit 126 generally presents the contents from the address FatherLoc(Father (N_B_S)) to the circuit 122. The contents received by the circuit 122 may be stored in the register R_T_Q. The value N_B_S may be set to Father(N_B_S). The process may continue with the step 4. Based on the above steps, the enqueue process generally works for no more than $2 \times (\log_2((H\_S)-1)-1)+3 = 2 \times \log_2((HS)-1)+1$ clock cycles to add the new timer.

Consider the following example application of the enqueue process for a case where the values H_MIN.ET=502, H_MIN.ID=4 and BUSY_FLAG=0. The circuit 126 may be as described in FIG. 3 with the binary heap 100 described in FIG. 1. A current system clock cycle (e.g., value of the system timer in the signal TIME) may be 100. A create timer request may occur for a new timer with values start time=601 and timer_ID=11.

During the 100-th clock cycle:
  a) The new timer information may be written in the circuit 124 at the address 11 (e.g., timer_ID).
  b) An expiration time E_T may be calculated as 601+ 100=701 clock cycles.
  c) A value pair (E_T=701, timer_ID=11) may be stored to the register E_B_S.
  d) Since the value H_S=10 is greater than zero and the value H_MIN_ET=502 is less than 701, the enqueue process may be started.
  e) Set the value BUSY_FLAG=1. Set the value N_B_S=H_S−1=9.
  f) The value H_S−1=9 is odd. Therefore, the value FatherLoc(9) may be calculated as 10/4=2. A read command may be sent to the circuit 126 to read the contents from the address 2.
  g) Set the value H_S=11.

During the 101-th clock cycle:
  a) The circuit 126 generally presents the contents for the two timers ((E_T=6243, Timer_ID=2),(E_T=4455, Timer_ID=8)) located at the address 2 to the circuit 122. The contents may be stored in the register R_T_Q.

During the 102-th clock cycle:
  a) The register R_T_Q may present the values ((E_T=6243, Timer_ID=2), (E_T=4455, Timer_ID=8)).
  b) The value Father(N_B_S)=Father(9)=8/2=4. The value FatherVal(N_B_S).ET=4455.
  c) Since the value FatherVal(N_B_S).ET=4455 is greater than the value E_B_S.ET=701 and the value Father(N_B_S)=4 is greater than zero, the value FatherLoc(Father(N_B_S)) may be calculated as 5/4=1. A read command may be sent to the circuit 126 for the contents from the address 1.

During the 103-th clock cycle:
  a) The values((E_T=4455, Timer_ID=8), P_E_B_S) may be written in the circuit 126 to the address Loc(N_B_S)=10/2=5. Note that the value P_E_B_S may be undefined at the time of the writing.
  b) The value TwinVal(Father(N_B_S))=(E_T=6243, Timer_ID=2) may be stored in the register P_E_B_S.
  c) The circuit 126 may present the values ((E_T=2123, Timer_ID=3), (E_T=3234, Timer_ID=10)) in response to the earlier read command. The values received by the circuit 122 may be stored in the register R_T_Q.
  d) Set the value N_B_S=Father(N_B_S)=4.

During 104-th clock cycle:
  a) The register R_T_Q may present the values ((E_T=2123, Timer_ID=3), (E_T=3234, Timer_ID=10)).
  b) The value Father(N_B_S)=Father(4)=3/2=1. The value FatherVal(N_B_S).ET=2123.
  c) Since the value FatherVal(N_B_S).ET=2123 is greater than the value E_B_S.ET=701 and the value Father(N_B_S)=1 is greater than zero, the value FatherLoc(Father(N_B_S)) may be calculated as 1/4=0. A read command may be sent to the circuit 126 to read the contents from the address 0.

During the 105-th clock cycle:
  a) The values (P_E_B_S, (E_T=2123, Timer_ID=3))= ((E_T=6243, Timer_ID=2), (E_T=2123, Timer_ID=3)) may be written in the circuit 126 at the address Loc(N_B_S)=5/2=2.
  b) The value TwinVal(Father(N_B_S)) (ET=3234, Timer_ID=10) may be stored in the register P_E_B_S.
  c) The circuit 126 may present the values ((*,*), (E_T=1234), Timer_ID=5)) to the circuit 122. The values may be stored in the register R_T_Q. The symbol (*,*) generally means that upper-half entry at the address 0 is not used and may be undefined.
  d) Set the value N_B_S=Father(N_B_S)=1.

During the 106-th clock cycle:
  a) The register R_T_Q may present the values ((*,*), (E_T=1234), Timer_ID=5)).
  b) The value Father(N_B_S)=Father(1)=0/2=0. The value FatherVal(N_B_S).ET=1234.
  c) Since the value FatherVal(N_B_S).ET=1234 is greater than the value E_B_S.ET=701 and the value Father(N_B_S)=0, the values ((0,0), (E_T=701, Timer_ID=11)) may be written in the circuit 126 at the address 0.

During the 107-th clock cycle:
  a) The values ((E_T=1234), Timer_ID=5), (E_T=3234, Timer_ID=10)) may be written in the circuit 126 to the address Loc(N_B_S)=2/2=1. The value BUSY_FLAG is generally set to zero, and the process stopped.

Figure 5:
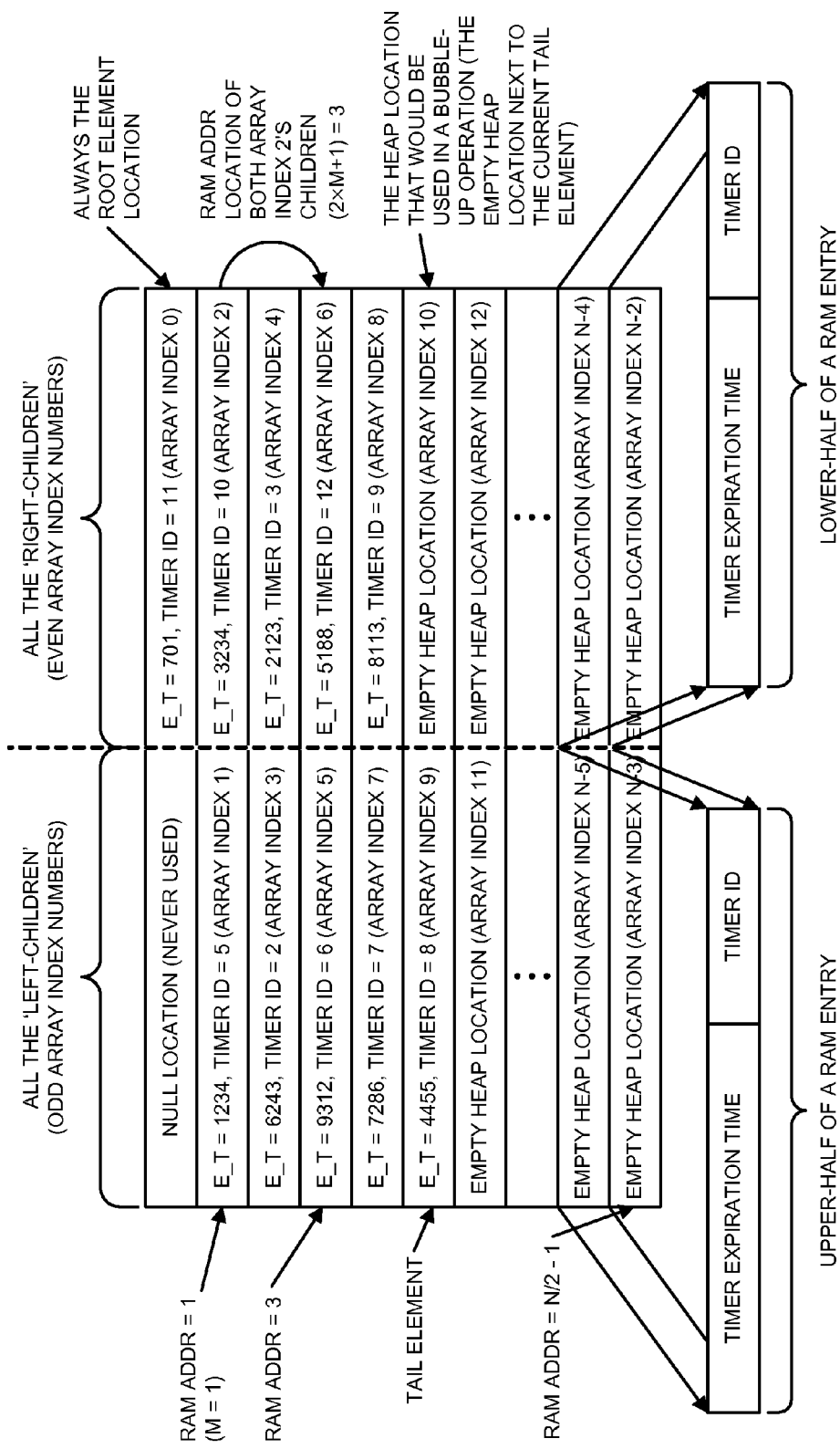
FIG. 5 is a diagram of the timer queue memory after an enqueue process has been performed.

Referring to FIG. 5, a diagram of the circuit 126 after the enqueue process has been performed is shown. A new timer with an expiration time=701 is now at the root of the heap 100 (e.g., address 0). The timer with the expiration time=1234 has been move to the address=1, a row below the new timer. The other times may be re-sorted according to the expiration timer values.

The requeue process: The requeue(or bubble-down) process may include the following steps:

Step 1. C_MIN generally contains information about timer

Step 1a. If the value C_MIN.D=1 (e.g., should-be-deleted condition is true) or the value C_MIN.T indicates a one-shot timer, the timer should be deleted. Therefore, if the value F_S=1, set the values F_S=0, H_S=0 and stop. Otherwise the value BUSY_FLAG may be set to one. The circuit 122 may send a read command to the circuit 126 to read the contents from the address Loc((F_S)−1). If H_S=F_S, set H_S=(HS)−1. The value F_S may be set to (F_S)−1 and the process may continue at step 2.

Step 1b. If the value C_MIN.D=0 and C_MIN.T indicates that the timer is periodic, the timer should be requeued. The circuit 122 generally calculates a new expiration time E_T=H_MIN.ET+C_MIN.P for the periodic timer. Set H_MIN.ET=E_T. If the value H_S=1, the process may be stopped. Otherwise, the value BUSY_FLAG may be set to one. The circuit 122 may send a read command to the circuit 126 to acquire the contents from the address 0. Set N_B_S=0 and the process may continue at step 3.

Step 2. During a next clock cycle: The circuit 126 generally presents the contents from the address Loc(F_S) to the circuit 122. The circuit 122 may store the value Val(F_S) to the register H_MIN. The circuit 122 may send a read command to the circuit 126 for the contents from the address 0. Set N_B_S=0 and continue with step 3.

Step 3. During a next clock cycle: The circuit 126 generally present the content at the address 0 to the circuit 122. The circuit 122 may store the received contents to the register R_T_Q. The circuit 122 may send a read command to the circuit 126 to obtain the contents from the address 1. The circuit 122 may also send a read command to the circuit 124 to read the contents from the address H_MIN.ID. Continue with the step 4.

Step 4. During a next clock cycle: The register R_T_Q may present the contents read from the circuit 126 at the address 0. If the value H_MIN.ET<Val(0).ET, the contents received from the circuit 124 may be stored to the register C_MIN. Set the value BUSY_FLAG=0 and stop. Otherwise, write the values((0,0), Val(0)) in the circuit 126 at the address 0. The circuit 122 may send a read command to the circuit 124 for the contents from the address Val(0),ID. Set the values E_B_S=H_MIN, H_MIN=Val(0) and P_E_B_S=(0,0). The circuit 126 generally presents the content 10 stored at address 1 to the circuit 122. The circuit 122 generally stores the received contents to the register R_T_Q. The process may continue at step 5a.

Step 5. During a next clock cycle:

Step 5a. The contents received by the circuit 122 from the circuit 124 may be stored to the register C_MIN.

Step 5b. The contents of the register R_T_Q may be written to the circuit 126 at the address ChildrenLoc(N_B_S).

Step 5c. If the values E_B_S.ET≤LeftChildVal(N_B_S).ET and E_B_S.ET≤RigthChildVal(N_B_S).ET, the value BUSY_FLAG may be set to zero and the processes stops.

Step 5d. Let M=(LeftChildVal(N_B_S).ET≤RigthChildVal(N_B_S).ET)?LeftChild(N_B_S):RigthChild(N_B_S), (e.g., M may be an index of the child with a minimal expiration time.) The phrase (A≤B)?C:D generally means that if the expression A≤B is true, return the value C, else return the value D.

Step 5e. Let L=(LeftChild(M)≥H_S−1)?1:0 (e.g., L=1 only if M is a leaf). Set IS_LEAF=L.

Step 5f. If L=1, write the values TwinVal(M) and E_B_S (in correct order) in the circuit 126 at the address ChildrenLoc(N_B_S). If L≠1, the circuit 122 may calculate ChildrenLoc(M) and send a read command to the circuit 126 to retrieve the contents from the address ChildrenLoc(M).

Step 5g. Swap the timer being sorted and the minimal child (e.g., set E_B_S=Val(M) and if M is a left child, set E_B_S to the upper-half of R_T_Q, else set E_B_S to the lower-half of R_T_Q.)

Step 5h. Set PARENT_ID=N_B_S, N_B_S=M.

Step 5i. Continue with step 6.

Step 6. During a next clock cycle: The values P_E_B_S and E_B_S (in correct order) may be written in the circuit 126 at the address Loc(PARENT_ID). If IS_LEAF=1, the value BUSY_FLAG may be set to zero and the process may stop. Otherwise, set the values E_B_S=Val(N_B_S) and P_E_D_S=TwinVal(N_B_S). The circuit 126 generally presents the contents at the address ChildrenLoc(N_B_S) to the circuit 122. The circuit 122 may store the received contents in the register R_T_Q. The process may continue with step 5b. The requeue process generally works using no more than 2×(log$_2$((H_S)−1)−1)+4=2×log$_2$((H_S)−1)+2 clock cycles.

Consider an example of application of the requeue process for a case where the value H_MIN.ET=500, H_MIN.ID=4, C_MIN.P=5000, C_MIN.D=0 and BUSY_FLAG=0. The value C_MIN.T may indicate that the timer is a periodic timer. The circuit 126 may be as described in FIG. 3, (e.g., storing the binary heap 100 described in FIG. 1). The current system clock cycle (e.g., value of system timer) may be 500. Since the value H_MIN.ET generally matches the value of system timer, the requeue process may be activated.

During the 500-th clock cycle:
a) Since the value C_MIN.D=0 and the value C_MIN.T may indicate a periodic timer, a new expiration time E_T=H_MIN.ET+C_MIN.P=500+5000=5500 may be calculated for the periodic timer. Set the value H_MIN.ET=E_T=5500. Set the value BUSY_FLAG=1. Step the value N_B_S=0. A read command may be sent to the circuit 126 to obtain the timer from address 0.

During the 501-th clock cycle:
a) The circuit 126 generally present a content ((*,*), (E_T=1234), Timer_ID=5)) to the circuit 122. The circuit 122 generally stores the received content to the register R_T_Q.
b) The circuit 122 may send a read command to the circuit 126 for the contents at the address 1.
c) The circuit 122 may send a command to the circuit 124 to read from the address H_MIN.ID.

During the 502-th clock cycle:
a) The register R_T_Q may present the values ((*,*), (E_T=1234), Timer_ID=5)).
b) The value H_MIN.ET=5500 is greater than the value Val(0).ET=1234. Therefore, the values ((0,0), (E_T=1234), Timer_ID=5)) may be written into the circuit 126 at the address 0. The circuit 122 may also send a read command to the circuit 124 from the data at the address Val(0),ID=5. The circuit 122 may also set the values E_B_S=H_MIN, H_MIN=Val(0) and P_E_B_S=(0,0). The circuit 126 may present the values ((ET=2123, Timer_ID=3),(ET=3234, Timer_ID=10)) to the circuit 122. The circuit 122 may store the values in the register R_T_Q.

During the 503-th clock cycle:
a) The content presented by the circuit 124 to the circuit 122 may be stored in the register C_MIN.
b) The register R_T_Q generally presents the values ((E_T=2123, Timer_ID=3), E_T=3234, Timer_ID=10)).
c) The value E_B_STET=5500>LeftChildVal(0).ET=2123. Therefore, M=(2123≤3234)?(2*0+1):(2*0+2)=1.
d) The value LeftChild(1)=2×1+1=3 is less than the value (H_S)−1=9. Therefore, the value L may be set to zero. The circuit 122 may also set the value IS_LEAF=L=0.
e) Since the value L=0, the circuit 122 may calculate ChildrenLoc(1)=2×Loc(1)+1-mod(1)=2×(1+1)/2+1−1=2. The circuit 122 may also send a read command to the circuit 126 to read from the address 2.
f) The circuit 122 generally swaps the timer being sorted and the minimal child (e.g., set E_B_S=Val(1)=(E_T=2123, Timer_ID=3) and R_T_Q=((E_T=5500, Timer_ID=4), (E_T=3234, Timer_ID=10)).

Set the values PARENT_ID=N_B_S=0 and N_B_S=M=1.

During the 504-th clock cycle:
a) Write the values ((0,0), (E_T=2123, Timer_ID=3)) in the circuit 126 at the address Loc(0)=0.
b) Since IS_LEAF=0, the circuit 122 may set the value E_B_S. Val(1)=(E_T=5500, Timer_ID=4) and the value P_E_B_S=TwinVal(1)=(E_T=3234, Timer_ID=10).
c) The circuit 126 may present the values ((E_T=6243, Timer_ID=2), (E_T=4455, Timer_ID=8)) to the circuit 122. The circuit 122 may store the values to the register R_T_Q.

During the 505-th clock cycle:
a) The register R_T_Q may present the values ((E_T=6243, Timer_ID=2), (E_T=4455, Timer_ID=8)).
b) The value E_B_S.ET=5500 is greater than the value RightChildVal(1).E_T=4455. Therefore, M=(6243≤4455)?(2×1+1):(2×1+2)=4.
c) LeftChild(4)=2×4+1=9=(115)−1. Therefore, L=1. The value IS_LEAF=L=1.
d) Since L=1, the circuit 122 may write the values ((E_T=6243, Timer_ID=2), (E_T=5500, Timer_ID=4)) in the circuit 126 at the address ChildrenLoc(1)=2.
e) Swap the timer being sorted and minimal child (e.g., set E_B_S=Val(4)=(E_T=4455, Timer_ID=8) and R_T_Q= ((E_T=6243, Timer_ID=2),(E_T=5500, Timer_ID=4)).
f) Set the value PARENT_ID=N_B_S=1, N_B_S=M=4.

During the 506-th clock cycle:
a) The circuit 122 may write the values ((E_T=4455), Timer_ID=8), (E_T=3234, Timer_ID=10)) in the circuit 126 at the address Loc(1)=1.

b) Since IS_LEAF=1, the value BUSY_FLAG may be set to zero, and the process may stop.

Figure 6:
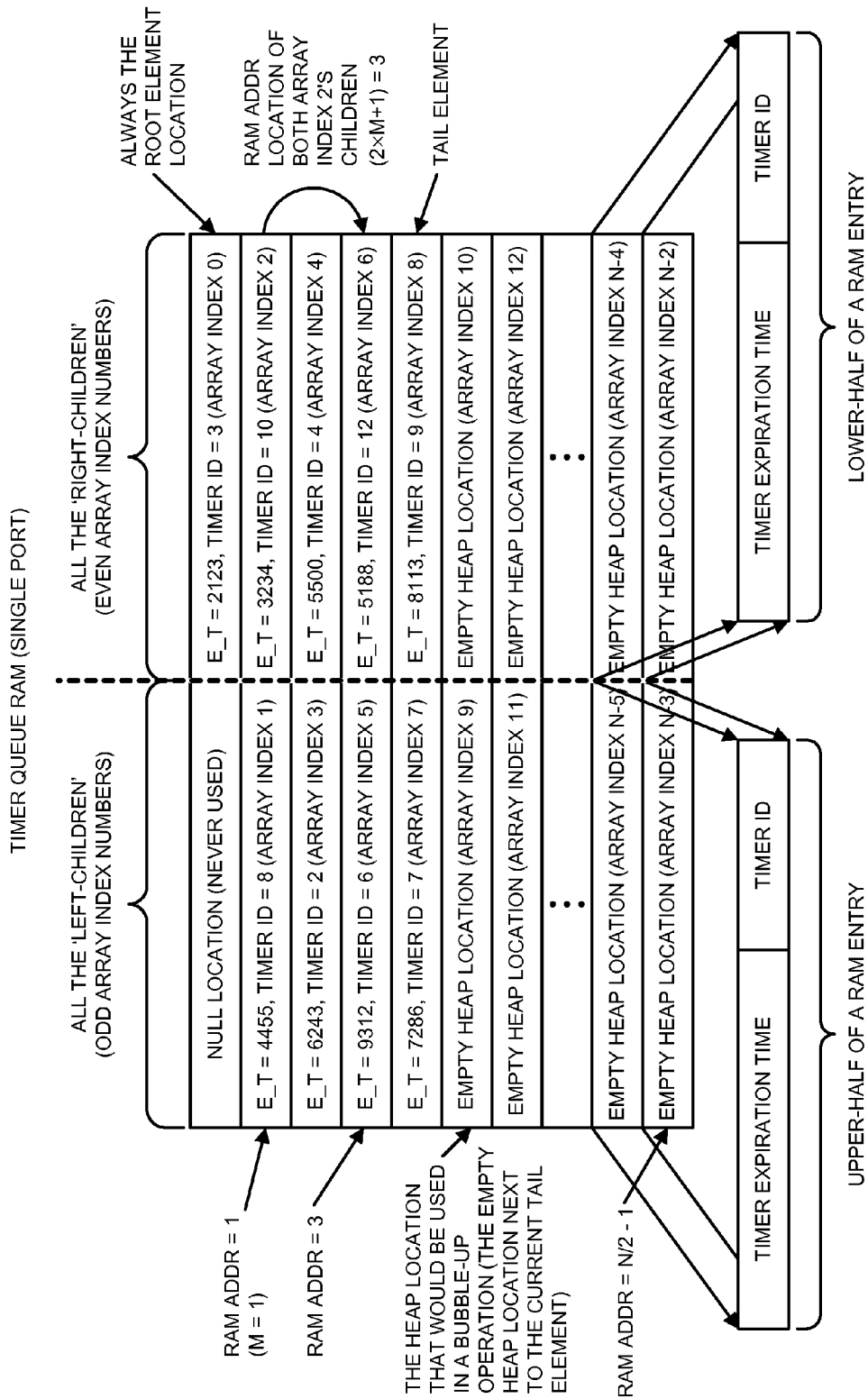
FIG. 6 is a diagram of the timer queue memory after a requeue process has been performed.

Referring to FIG. 6, a diagram of the circuit 126 after the requeue process has been performed is shown. The timer with the expiration time=1234 may be gone from the circuit 126. The timer with the next closest expiration time=2123 may be moved into the root location at the address 0. The child timer with expiration time 4455 may be moved from the right side of the array at the address 2 into the left side of the array at the address 1. The rest of the timers may be sorted accordingly.

The functions performed by the diagrams of FIGS. 2 and 4 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIG. 2 represent logical data flows. The logical data flows are generally representative of physical data transferred between the respective blocks by, for example, address, data, and control signals and/or busses. The system represented by the circuit 100 may be implemented in hardware, software or a combination of hardware and software according to the teachings of the present disclosure, as would be apparent to those skilled in the relevant art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first memory configured to store a plurality of timers, wherein (i) each of said timers comprises a respective value that indicates an expiration time and (ii) a first one of said timers nearest to expiring is stored at a first address of said first memory; and
a circuit configured to (i) assert a signal in response to said respective value of said first timer matching a counter of time, (ii) read a second of said timers and a third of said timers both from a second address of said first memory, (iii) determine that said second timer or said third timer expires next by comparing said second timer only with said third timer and (iv) replace said first timer by writing one of said second timer or said third timer that expires next into said first memory at said first address.

2. The apparatus according to claim 1, wherein said timers are organized in a binary minimum heap with said first timer at a root of said binary minimum heap.

3. The apparatus according to claim 1, further comprising a second memory configured to store a plurality of configurations, wherein (i) each of said configurations is stored at a respective address of said second memory and (ii) each of said timers further comprises one of said respective addresses.

4. The apparatus according to claim 1, wherein said circuit is further configured to add a new one of said timers to said first memory at a given address of said first memory already storing a single one of said timers.

5. The apparatus according to claim 1, wherein a periodic one of said timers has a minimum timer period of no greater than three clock cycles.

6. The apparatus according to claim 1, wherein said apparatus is implemented as one or more integrated circuits.

7. The apparatus according to claim 1, wherein said timers that can be added to said first memory per second is at least a number of clock cycles per second divided by a function of a number of said timers already stored in said first memory.

8. The apparatus according to claim 3, wherein each of said configurations comprises a respective item and a respective flag.

9. The apparatus according to claim 8, wherein said circuit is further configured to set said respective flag of a given one of said timers to a delete condition upon expiration of said given timer where said respective item indicates a one-shot type of timer.

10. The apparatus according to claim 8, wherein said circuit is further configured to reset said respective value of a given one of said timers upon expiration of said given timer where said respective item indicates a periodic type of timer.

11. The apparatus according to claim 8, wherein said circuit is further configured to remove a given one of said timers from said first memory and a corresponding one of said configurations from said second memory where said respective flag has a delete condition.

12. A method of timer management, comprising the steps of:
   (A) storing a plurality of timers in a first memory, wherein (i) each of said timers comprises a respective value that indicates an expiration time and (ii) a first one of said timers nearest to expiring is stored at a first address of said first memory;
   (B) asserting a signal in response to said respective value of said first timer matching a counter of time;
   (C) reading a second of said timers and a third of said timers both from a second address of said first memory;
   (D) determining that said second timer or said third timer expires next by comparing said second timer only with said third timer; and
   (E) replacing said first timer by writing one of said second timer or said third timer that expires next into said first memory at said first address.

13. The method according to claim 12, wherein said timers are organized in a binary minimum heap with said first timer at a root of said binary minimum heap.

14. The method according to claim 12, further comprising the step of:
   storing a plurality of configurations in a second memory, wherein (i) each of said configurations is stored at a respective address of said second memory and (ii) each of said timers further comprises one of said respective addresses.

15. The method according to claim 12, further comprising the step of:
   adding a new one of said timers to said first memory at a given address of said first memory already storing a single one of said timers.

16. The method according to claim 12, wherein said timers that can be added to said first memory per second is at least a number of clock cycles per second divided by a function of a number of said timers already stored in said first memory.

17. The method according to claim 14, wherein each of said configurations comprises a respective item and a respective flag.

18. The method according to claim 17, further comprising the step of:
   setting said respective flag of a given one of said timers to a delete condition upon expiration of said given timer where said respective item indicates a one-shot type of timer.

19. The method according to claim 17, further comprising the step of:
   resetting said respective value of a given one of said timers upon expiration where said respective item indicates a periodic type of timer.

20. The method according to claim 17, further comprising the step of:
   removing a given one of said timers from said first memory and a corresponding one of said configurations from said second memory where said respective flag has a delete condition.

21. An apparatus comprising:
   means for storing a plurality of timers, wherein (i) each of said timers comprises a respective value that indicates an expiration time and (ii) a first one of said timers nearest to expiring is stored at a first address of said means for storing; and
   means for managing configured to (i) assert a signal in response to said respective value of said first timer matching a counter of time, (ii) read a second of said timers and a third of said timers both from a second address of said means for storing, (iii) determine that said second timer or said third timer expires next by comparing said second timer only with said third timer and (iv) replace said first timer by writing one of said second timer or said third timer that expires next into said means for storing at said first address.

22. The apparatus according to claim 7, wherein said function is twice a binary logarithm of a sum of said number of said timers already stored in said first memory plus two.

* * * * *